July 1, 1930.  H. M. PFLAGER  1,768,860
LOCOMOTIVE STRUCTURE
Filed Aug. 17, 1928
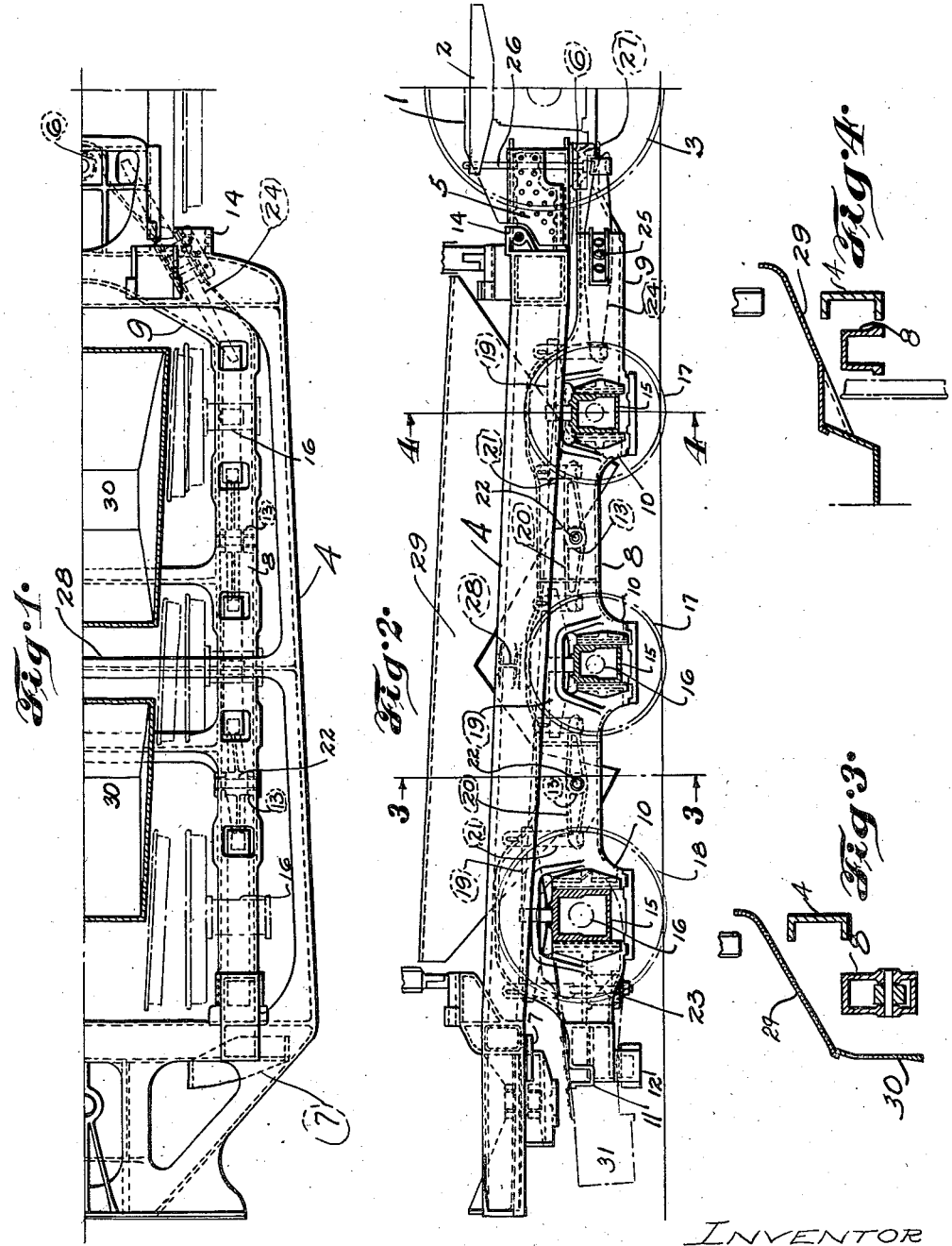
INVENTOR
Harry M. Pflager
By Rodney Bedell
ATTORNEY Patented July 1, 1930

1,768,860

UNITED STATES PATENT OFFICE

HARRY M. PFLAGER, OF ST. LOUIS, MISSOURI, ASSIGNOR, BY MESNE ASSIGNMENTS, TO GENERAL STEEL CASTINGS CORPORATION, OF GRANITE CITY, ILLINOIS, A CORPORATION OF DELAWARE

LOCOMOTIVE STRUCTURE

Application filed August 17, 1928. Serial No. 300,203.

My invention relates to railway rolling stock and consists in a novel truck construction and associated structure particularly adapted for use in locomotives.

With the increasing sizes of locomotives and particularly of the fire box and associated parts, it is essential that more adequate provision be made for the carrying of the locomotive structure at the rear of the drivers, and the main object of my invention is to provide a trailer truck for this purpose which will include at least three axles and a corresponding number of pairs of wheels.

Another object of my invention is to provide a suitable equalizing system for distributing the trailer truck load to the axles and wheels, and I also prefer to combine the truck equalizing system with the main equalizing system of the locomotive, including the driver springs.

Another object of my invention is to provide a truck of this type in which one pair of wheels with their axle and journals are adapted to carry a larger proportion of the truck load than either of the other axles and corresponding wheels and journals. Preferably the axle and wheels adapted for the heavier load will be provided with a booster motor in itself increasing the load on that axle and utilizing the increased load of the motor and the superimposed load to provide increased traction when the locomotive is starting or is laboring up a steep grade.

In the accompanying drawings which illustrate a selected embodiment of my invention—

Figure 1 is a one-half top longitudinal view of the cradle, trailer truck, and associated parts of a locomotive.

Figure 2 is a side elevation of the same.

Figures 3 and 4 are vertical transverse sections taken on lines 3—3 and 4—4 of Figure 2.

The rear end of the main frame of the locomotive is indicated at 1 and it will be understood that this frame is supported from the driver journals by means of the usual spring and equalizer system, the rear spring being shown at 2 and the rear driver at 3. A cradle 4 forms a rearward extension of the main frame 1 and is shown as bolted to the same at 5, but it will be understood that the cradle may be formed integrally with the main frame 1, if desired. The forward end of cradle 4 is provided with a centrally located downwardly facing spherical-shaped bearing 6 and the rear portion of the cradle is provided with transversely spaced downwardly facing side bearing pads 7 adapted to be supported by the usual rocker bearings (not shown) mounted on the truck frame. Brake hanger brackets are shown at 14.

The truck frame includes wheel pieces 8 converging at their forward ends as indicated at 9 and including pedestal legs 10, side bearing brackets 11, a rear cross bar 12, equalizing fulcrum bearings 13, and other suitable parts usually provided in truck frames of this character.

I prefer to form the truck frame of a one-piece casting and I illustrate such a frame in my drawings.

Each wheel piece is provided with a series of three pedestals to accommodate a corresponding number of boxes 15 in which the axles 16 of the truck wheels 17 and 18 are journaled.

Each box mounts a leaf spring 19 and the respective ends of adjacent springs support equalizing levers 20 through hangers 21, the equalizers being fulcrumed on the truck frame by pins 22 seated in bearings 13.

The rear end of the rear spring is anchored to the truck frame at 23 by a suitable link and the front end of the front spring supports the rear end of an equalizing lever 24 which is fulcrumed at 25 on the forward portion 9 of the truck frame and is supported at its forward end from the rear end of the main driver spring 2 by a 'link 26.

In the described structure, the truck frame is supported by the equalizing system at points 22, intermediate the truck wheels, and at points 23 and 25 at the rear and front, respectively, of the truck wheels. The superimposed load of the cradle and superstructure mounted thereon is borne by the transversely spaced brackets 11 at the rear of the truck frame and by the centrally located upwardly facing bearing 27 which receives the downwardly facing cradle bearing element 6. This provides a stable distribution of the load to the truck frame and from the frame to the supporting wheels, a part of this load being equalized into the main spring system through the forward equalizers 24, the latter similarly functioning to equalize a portion of the main frame load into the truck spring system.

The length of the cradle 4 makes a cross tie 28 desirable and the provision of the three trailer axles makes it possible to advantageously locate the cross tie 28 over the intermediate axle of the truck, leaving the space between the axles clear for the downwardly extending hoppers 30 of the ash pan 29, and thereby avoiding the limitations on the ash pan structure which rise from the location of the cradle cross bar at a point intermediate the truck wheels, such as are likely to be present in four wheel trailer trucks of the type illustrated in my patent No. 1,639,664, issued August 23, 1927.

I indicate a booster motor 31 mounted directly on the rear cross bar 12 and on the rear axle 16 which arrangement places a substantial load upon rear axle 15 in addition to the superimposed load which is equalized between the axles and I show the wheels, journals, and boxes of this rear axle as being of larger size than the corresponding parts associated with the other two axles of the truck structure. This construction necessitates greater spacing for the legs of the rear pedestals, and the distance transversely of the truck frame between the center lines of the pedestals for the rear axle will be greater than the corresponding distance between the center lines of the pedestals of the other axles. The reasons for this difference in size of the rear axle and wheel construction is set forth above and in the introductory portion of the specification and will be well understood by those skilled in the art.

It is obvious that many of the details of my invention may be varied and that some of the features may be omitted without departing from the spirit of the invention, and I contemplate the exclusive use of such modifications as come within the scope of my claims.

I claim:

1. In a locomotive trailer truck, a frame including wheel pieces, at least three axles mounting said frame, and bearings for superimposed load on said frame nearer to the ends of the frame than to said axles and below the level of the tops of said wheel pieces.

2. In a locomotive trailer truck, a frame, at least three axles mounting said frame, equalizers supported from said axles and carrying said frame, and bearings for superimposed load on said frame nearer to the ends of said frame than the connection thereto of said equalizers.

3. In a locomotive trailer truck, a frame including wheel pieces, at least three axles mounting said frame, equalizers housed in said wheel pieces and supported from said axles and carrying said frame at points between said axles, said frame being adapted to support superimposed load at points to the front of and at the rear of the points at which said equalizers are connected to said frame.

4. In a six wheel truck frame, three pairs of pedestals, the center lines of the pedestals of two pairs being similarly spaced apart transversely of the frame and the center lines of the pedestals of the third pair being spaced apart a greater distance.

5. In a six wheel truck frame, three pairs of pedestals, the center lines of the pedestals of at least one pair being spaced apart transversely of the frame a different distance from the center lines of the pedestals of another pair.

6. In a six wheel trailer truck, a truck frame, three pairs of wheels with axles journaled in said frame, one pair of wheels being adapted to carry a greater proportion of the load than either of the other pairs of wheels.

7. In a six wheel trailer truck, a truck frame, three pairs of wheels with axles journaled in said frame, one pair of wheels being adapted to carry a greater proportion of the load than either of the other pairs of wheels, and a booster motor operatively connected to the axle of said pair of wheels.

8. In a trailer truck adapted to support superstructure load at its ends, a frame having wheel pieces, a series of at least three wheeled axles, and a plurality of equalizers housed in and supporting each of said wheel pieces from said axles.

9. In a trailer truck adapted to support superstructure load at its ends, a frame having wheel pieces, a series of at least three wheeled axles, an equalizer housed in and supporting each of said wheel pieces from said axles at a point between the front and intermediate axle, and an equalizer housed in and supporting each of said wheel pieces at a point between the intermediate and rear axle.

10. In a trailer truck adapted to support superimposed load at its ends, a frame having wheel pieces, at least three axles, springs supported by said axles, and a plurality of equalizers suspended below said springs and housed in and supporting each wheel piece at points between adjacent axles.

11. In a trailer truck adapted to support superimposed load at its front and rear ends, a frame having wheel pieces, three axles, a spring equalizing system supporting each of said wheel pieces from said axles, each of said spring systems being located below the top of its respective wheel piece and connected to its respective wheel piece at a point in front of the front axle, at a point in rear of the rear axle, and at a plurality of points between said front and rear axles.

12. In a steam locomotive, a main frame, a six wheel trailer truck pivoted to said main frame, a rearward extension of said main frame supported on a rear portion of said truck, and an ash pan located between the sides of said extension with hoppers extending downwardly between the axles of said truck.

13. In a locomotive, a main frame, a six wheel trailer truck pivoted to said main frame, and a rearward extension of said main frame supported on a rear portion of said truck, the rear pair of trailer truck wheels being adapted to carry a greater load than either of the other pairs of trailer truck wheels.

14. In a locomotive, a main frame, a six wheel trailer truck pivoted to said main frame, a rearward extension of said main frame supported on a rear portion of said truck, the rear pair of trailer truck wheels being adapted to carry a greater load than either of the other pairs of trailer truck wheels, and a booster motor operatively connected to said rear pair of wheels.

15. In a locomotive, driver axles, a trailer truck including a frame and three axles, means for supporting said frame from said axles at points located in front of and to the rear of said axles and at a plurality of points intermediate said axles, said frame being adapted to receive superimposed load at a single point near its forward end and at laterally spaced points at the rear of its rear axle, and a series of interconnected springs and equalizing levers distributing all of the superimposed load to all of said axles.

16. In a locomotive, a main frame, a driver spring equalizing system supporting said frame, a truck frame, three trailer truck axles, a truck spring equalizing system supporting said truck frame, and an equalizer connecting the adjacent ends of said spring systems and supporting one of said frames.

17. In a locomotive, a main frame, a driver spring equalizing system supporting said frame, a truck frame, three trailer truck axles, a truck spring equalizing system supporting said truck frame, and an equalizer pivoted on said truck, with its ends supported from the adjacent ends of said spring systems so as to form a continuous equalizing system for the main frame and the truck frame.

18. In a locomoive, a main frame, driver axles, springs carried thereby, a trailer truck frame, at least three trailer truck axles, springs carried thereby, and equalizers supporting said frames from all of said springs.

19. In a locomotive, a cradle having side members and a cross bar between them, and a trailer truck frame supporting said cradle and including wheel pieces located between said side members, and a truck axle located substantially vertically below said cross bar.

20. In a locomotive, a cradle having side members and a cross bar between them, an ash pan having hoppers extending downwardly on each side of said cross bar, and a trailer truck having an axle substantially vertically below said cross bar and between said hoppers and having other axles at the opposite sides of said hoppers.

21. In a trailer truck adapted to support superstructure load at its ends, a frame having wheel pieces, a series of at least three wheeled axles, and a plurality of equalizers located between the front and rear axles and supporting each of said wheel pieces from said axles, and equalizers on each side supporting said truck frame and located forward of the front axle.

22. In a six wheel truck frame, a wheel-piece having three pedestals, the legs of two pedestals being similarly spaced apart longitudinally of the truck frame and legs of the other pedestal being spaced apart a greater distance.

23. A one piece trailer truck frame provided with load supporting elements at its opposite ends and including wheel pieces between said elements, pedestals for at least three journal boxes on each of said wheel-pieces, and an equalizer fulcrum on each wheel piece between each pair of adjacent pedestals and below the top of the wheel piece.

24. A trailer truck including a frame arranged to journal at least three axles and including wheel pieces and an equalizing system supporting said wheel pieces from said axles, and a main frame extension including side members spaced apart a greater distance than said wheel pieces and located in part below the level of the top of said wheel pieces.

25. A trailer truck including a frame arranged to journal at least three axles and including wheel pieces and an equalizing system supporting said wheel pieces from said axles, a main frame extension including side members spaced apart a greater distance than said wheel pieces and located in part below the level of the top of said wheel pieces, and ash pan hoppers located between said axles and along the center line of the locomotive.

In testimony whereof I hereunto affix my signature this 11th day of Aug., 1928.

H. M. PFLAGER.